United States Patent
Cheneau

(10) Patent No.: US 8,385,891 B2
(45) Date of Patent: Feb. 26, 2013

(54) BACKUP OF BAD QUALITY VOICE MESSAGES

(75) Inventor: Emilie Cheneau, Le Mans (FR)

(73) Assignee: ST-Ericsson SA, Geneva (CH)

( * ) Notice: Subject to any disclaimer, the term of this patent is extended or adjusted under 35 U.S.C. 154(b) by 422 days.

(21) Appl. No.: 12/523,911

(22) PCT Filed: Jan. 15, 2008

(86) PCT No.: PCT/IB2008/050127
§ 371 (c)(1),
(2), (4) Date: Jan. 14, 2010

(87) PCT Pub. No.: WO2008/090488
PCT Pub. Date: Jul. 31, 2008

(65) Prior Publication Data
US 2010/0136965 A1    Jun. 3, 2010

(30) Foreign Application Priority Data
Jan. 24, 2007 (EP) ..................... 07001492

(51) Int. Cl.
*H04W 40/00* (2009.01)
(52) U.S. Cl. .................. 455/412.1; 455/422.1
(58) Field of Classification Search ............ 455/412.1, 455/412.2, 413, 422.1, 466
See application file for complete search history.

(56) References Cited

U.S. PATENT DOCUMENTS

| | | | |
|---|---|---|---|
| 6,636,733 B1 | 10/2003 | Helferich | |
| 6,947,528 B1 | 9/2005 | Ko et al. | |
| 2003/0169865 A1 | 9/2003 | Oren | |
| 2005/0287993 A1 | 12/2005 | Gogic | |
| 2006/0128367 A1 | 6/2006 | Vanhatalo | |
| 2010/0222057 A1* | 9/2010 | Taylor et al. ............... | 455/435.1 |

FOREIGN PATENT DOCUMENTS

GB    2 370 949 A    7/2002

OTHER PUBLICATIONS

PCT International Search Report, PCT/IB2008/050127, mailing date Apr. 25, 2008.

* cited by examiner

*Primary Examiner* — Sam Bhattacharya
(74) *Attorney, Agent, or Firm* — William J. Kubida; Peter J. Meza; Hogan Lovells US LLP

(57) ABSTRACT

A method for backing up and re-transmitting voice messages being transmitted during a call from a mobile device to an answering machine with a dedicated address in a network includes measuring the transmission quality between the mobile device and the answering machine while a connection is established between the mobile device and the answering machine, recording the voice message in the mobile device while it is being transmitted to the answering machine, after the call has ended and the mobile device has disconnected from the network, creating a data message in the mobile device containing the recorded voice message and the address of the called device, setting up a connection from the mobile device to the network, and sending the data message.

10 Claims, 2 Drawing Sheets

(12) United States Patent
US 8,385,891 B2

BACKUP OF BAD QUALITY VOICE MESSAGES

CROSS-REFERENCE TO RELATED APPLICATIONS

The present application is a national filing in the U.S. Patent & Trademark Office of PCT/IB2008/050127 filed Jan. 15, 2008, and claims priority of European Patent Application No. 07001492.3 filed Jan. 24, 2007, both of which applications are incorporated herein in their entireties by this reference.

FIELD OF THE INVENTION

The invention relates to a method for the backup of voice messages.

BACKGROUND OF THE INVENTION

Such a method and corresponding devices are known e.g. from the document GB 2 370 949 A, where a portable cellular phone system with an automatic answering telephone function is described. The answering telephone functions are installed on both the network side and the terminal unit side. The system includes a section for transferring a voice mail message recorded first by an automatic answering telephone center on the network side. The message can be retreived by the adressee by operating a switch on a terminal unit in the phone system.

U.S. Pat. No. 6,636,733 B1 shows a messaging system with a mobile system routing calls to a message processor. The message processor comprises a voice store and forward system for receiving voice and forwarding voice messages. This can be achieved by means of a temporary mailbox associated with a specific callback number assigned to the message.

The known methods and devices, however, have shown the disadvantage that the messages left on the answering machine often are of poor quality or even inaudible. Since the answering machine itself is located within the network, the message recording requires a circuit switched call between the Mobile Station (MS) and the network. As any circuit switched transmission, this call may be affected thus resulting in a poor recording quality of the message.

OBJECT AND SUMMARY OF THE INVENTION

It is an object of the invention to provide a method of the type defined in the opening paragraph, in which the disadvantages defined above are avoided.

In order to achieve the object defined above, with a method according to the invention characteristic features are provided so that a method according to the invention can be characterized in the way defined below, that is:

measuring the transmission quality between the mobile device and the answering machine, when a connection is established between the mobile device and the answering machine,
recording the voice message in the mobile device while it is transmitted to the answering,
after the call has ended and the mobile device has disconnected from the network,
creating a MMS in the mobile device containing the recorded voice message and the address of the called device,
setting up a connection from the mobile device to the network, and
sending the MMS.

The characteristic features according to the invention provide the advantage that in areas of bad coverage the user is alerted that the message transmitted to the network might be of bad quality and that the user is enabled to send the content of the message to be left by means of a MMS not depending on the coverage.

The measures as claimed in claims 2 and 3 provide further details of the inventive method.

According to claim 4, the MMS advantageously can be sent automatically by the mobile device or manually by the user of said device.

Measuring the transmission quality between the mobile device and the answering machine by carrying out a physical transmission layer (L1) measurement by means of an L1 report constitutes has been proved reliable.

In order to take inventory of more than one recorded message it is suggested to store a couple of messages (limited by the available memory in the device), for instance labeled with the name of the call addressee and date and time of the call, and/or to overwrite previously stored messages each time the user records a new message.

It should be noted that the features of the inventive method can be directly implemented in a suitable mobile device like a mobile phone, a cordless phone, a PDA or the like, as claimed in claim 7.

The aspects defined above and further aspects of the invention are apparent from the exemplary embodiment to be described hereinafter and are explained with reference to this exemplary embodiment.

BRIEF DESCRIPTION OF THE DRAWINGS

The invention will be described in more detail hereinafter with reference to an exemplary embodiment. However, the invention is not limited to this exemplary embodiment.

DESCRIPTION OF PREFERRED EMBODIMENTS

Figure 1:
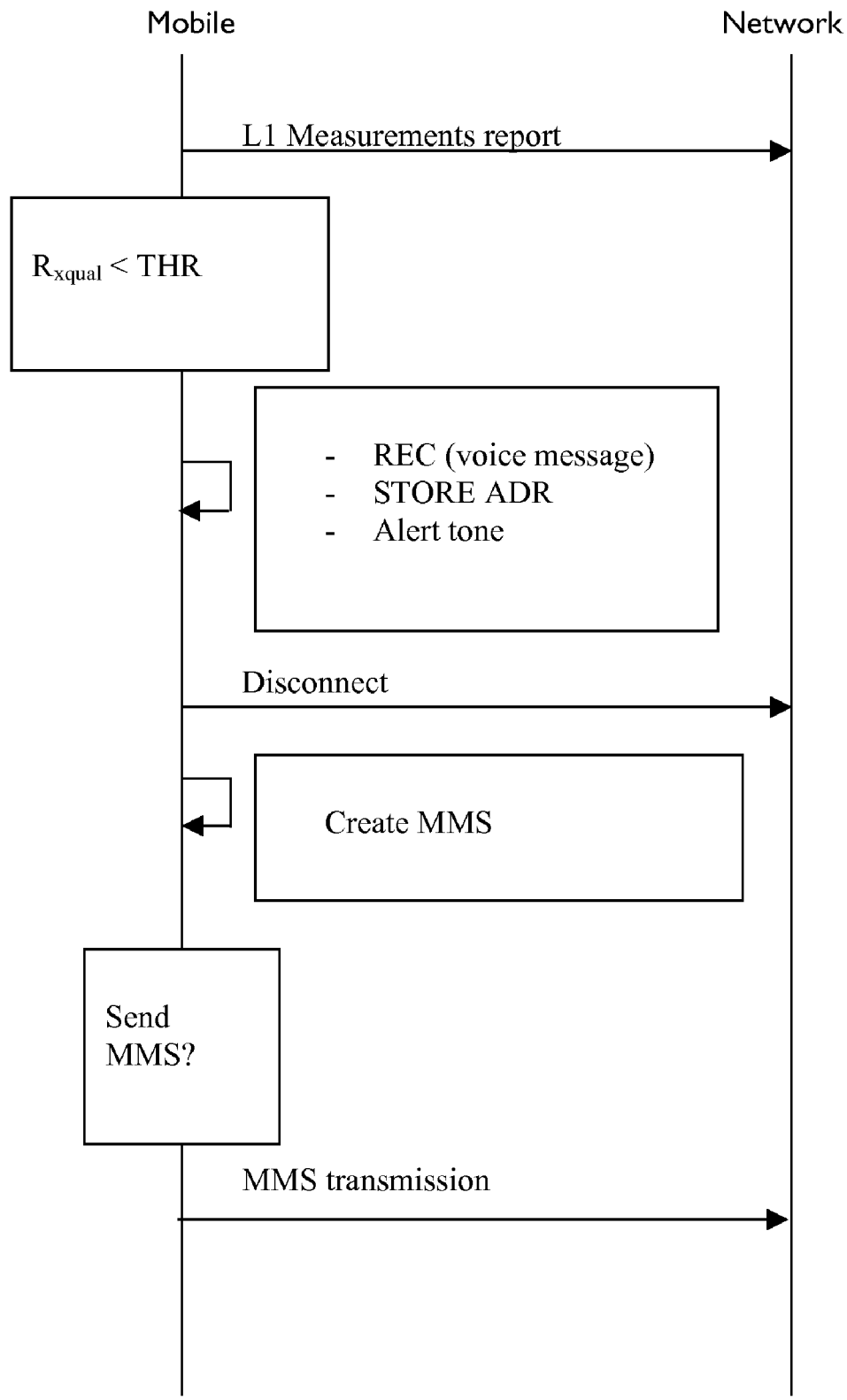
FIG. 1 shows a schematic diagram of the inventive method for the backup of voice messages which thread to be of bad recording quality due to insufficient reception conditions.

FIG. 1 shows a schematic diagram of the inventive method for the backup of voice messages. As mentioned earlier, the object of the invention is to inform the user of a mobile device if a message left on an answering machine of a person called by said user has been recorded in an area of bad coverage. According to the invention, the message is recorded as a voice message on the mobile device of the caller. The voice message recorded on the mobile device of the caller is represented by data forming a data-message. Since the message has been recorded locally, the user can send it via a Multimedia Messaging Service message after the call. Therefore the data-message is typically embedded in a frame of such a Multimedia Message Service message. The Multimedia Message Service message is defined via 3GPP or OMA standardization bodies and is hereinafter referred to as MMS. Alternatively, the MMS can be composed and sent after the call automatically. Without deviating from the gist of the invention the data-message can alternatively be transmitted via any different protocol, e.g. a streaming protocol or via WAP or GPRS or UMTS protocols, dependent on the actually available protocol or network service.

Referring to FIG. 1, the user on the mobile device makes a call and wants to leave a message on an answering machine of the person called in a network. The mobile device tests the level of reception according to the well-known OSI-ISO model containing seven layers. L1 in this model refers to the physical layer used for the transfer of the bits. A L1 measurement report is sent to the network where the answering machine is located, stating the quality of the coverage of the mobile device. It can be considered that if a transmission quality value $R_{xqual}$ (for a GSM device, or Ec/N0 for a UMTS one; the value and threshold depend on the protocol used) is smaller than a predetermined threshold value THR, the quality is bad and the inventive feature must be triggered.

As soon as the user is connected to the answering machine, the message is recorded on the device as an audio file (REC voice message) in an .AMR-file ("RecordedMessage.amr"), so that it can be sent at the end of the call and be kept by the user to remember the message left on the answering machine. The user can retrieve the message from the mobile device to control its contents.

If the measurement shows a value beneath the threshold THR, the user is informed by an alert tone. Simultaneously, the destination number ADR is stored in the mobile device as well (STORE ADR).

Figure 2:
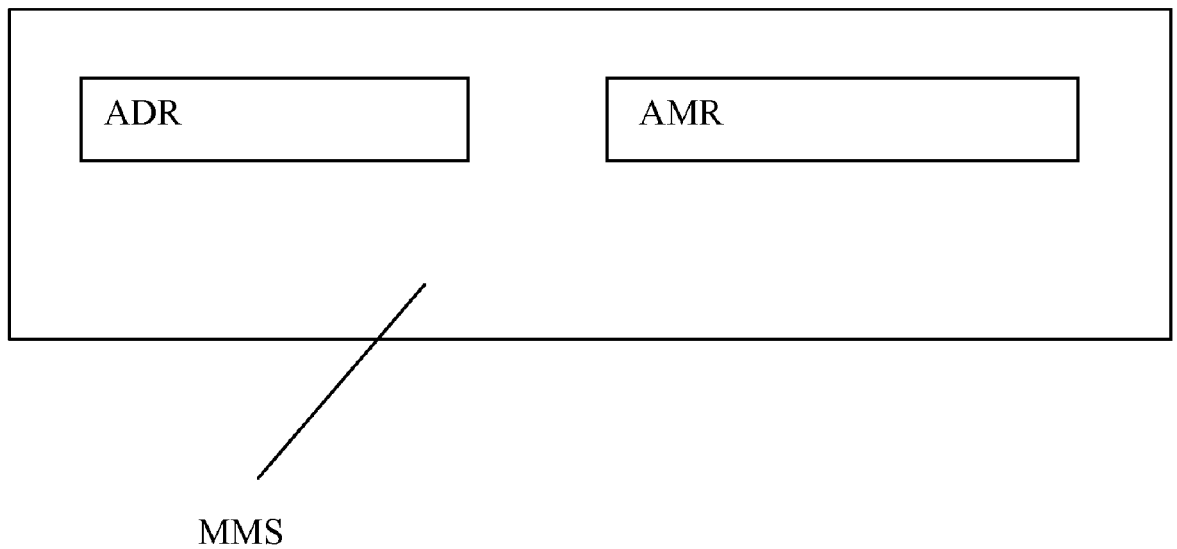
FIG. 2 shows the composition of the MMS to be sent from the mobile device.

In the next step, the disconnection at the end of the call is reported from the mobile device to the network. In the mobile device, the end of the call triggers the end of the voice message recording (REC voice message) as well as the creation of the MMS by linking the destination phone number ADR with the voice message file .AMR. The message system of the mobile device takes the .AMR recorded, writes it into an MMS frame, merges it with the destination number ADR stored at the beginning of the call and sends the MMS automatically (cf. FIG. 2). Alternatively, the user has the choice to send the voice message by MMS himself. In case the transmission of the MMS is started automatically by the mobile phone, the connection setup for the transmission is established automatically as well.

If the user wants to keep the message recorded, he has to rename the .amr-file, which contains the last message only. The message to be left on an answering machine is preferably stored in the phone in the same file named "RecordedMessage.amr", which will be written over by a new message each time the situation occurs.

In order to take inventory of more than one recorded message the user can also be provided with a choice to store a couple of messages (limited by the available memory in the device), for instance labeled with the name of the call addressee and date and time of the call, and/or to overwrite previously stored messages each time the user records a new message.

In the menu, the user has the choice to enable or disable this feature, or to be alerted only at the end of the message that the coverage was bad.

The invention can be implemented on every device which is suitable to make calls and record sounds, especially mobile phones, cordless phones, PDAs and the like.

It can be mentioned that the invention can also be realized by means of a computer program product, which can reside in a memory of a device and which can be executed by a processor of said device or which can reside on a computer readable medium, e.g. a solid state memory device or an optical data carrier like a CD, DVD or a network based server or the like, such that the computer program can be loaded from the computer readable medium into a device, e.g. a computer or laptop or whatsoever, where it will be executed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for backing up and re-transmitting a voice message being transmitted during a call from a mobile device to an answering machine with a dedicated address in a network, wherein the method comprises:
   measuring a transmission quality between the mobile device and the answering machine while a connection is established between the mobile device and the answering machine,
   recording the voice message in the mobile device while the message is transmitted to the answering machine,
   after the call has ended and the mobile device has disconnected from the network, creating a data-message containing the recorded voice message and the dedicated address,
   setting up a connection from the mobile device to the network, and
   sending the data-message.

2. The method according to claim 1, wherein recording the voice message includes:
   comparing a measured value from measuring the transmission quality to a predetermined threshold value,
   starting a voice message recording on the mobile device if the measured value is smaller than the threshold value,
   storing the recorded voice message in a file, and
   storing the dedicated address of the called device.

3. The method as claimed in claim 2, wherein creating the data-message includes:
   reading the dedicated address of the answering machine, stored on the mobile device,
   reading the voice message from the file, and
   merging both the address of the called device and the voice message into a frame of the data-message.

4. The method according to claim 2 further comprising:
   emitting an alert tone to inform the user of bad transmission quality.

5. The method as claimed in claim 1, wherein the setting up of the connection from the mobile device to the network and the sending of the data-message is executed automatically by the mobile device or manually by the user of the mobile device.

6. The method as claimed in claim 1, wherein measuring the transmission quality between the mobile device and the answering machine comprises carrying out a physical transmission layer measurement by means of a report.

7. The method according to claim 1, wherein more than one voice message can be stored and overwritten.

8. The method according to claim 7, wherein each voice message stored is labeled with the date and time of the call.

9. The method according to claim 7, wherein each voice message stored is labeled with a name associated with the answering machine and with the date and time of the call.

10. The method according to claim 1, wherein the mobile device comprises a mobile phone, a cordless phone, or a PDA.

* * * * *